(12) United States Patent
Shufer et al.

(10) Patent No.: US 11,579,993 B2
(45) Date of Patent: Feb. 14, 2023

(54) REGRESSION TESTING OF COMPUTER SYSTEMS USING RECORDED PRIOR COMPUTER SYSTEM COMMUNICATIONS

(71) Applicant: MICRO FOCUS LLC, Santa Clara, CA (US)

(72) Inventors: Ilan Shufer, Yehud (IL); Salman Yaniv Sayers, Yehud (IL)

(73) Assignee: MICRO FOCUS LLC, Sanford, NC (US)

( * ) Notice: Subject to any disclaimer, the term of this patent is extended or adjusted under 35 U.S.C. 154(b) by 568 days.

(21) Appl. No.: 16/548,346

(22) Filed: Aug. 22, 2019

(65) Prior Publication Data

US 2021/0056004 A1 Feb. 25, 2021

(51) Int. Cl.
*G06F 11/36* (2006.01)
*G06F 11/26* (2006.01)
(Continued)

(52) U.S. Cl.
CPC .............. *G06F 11/261* (2013.01); *G06F 9/54* (2013.01); *G06F 11/273* (2013.01);
(Continued)

(58) Field of Classification Search
CPC .. G06F 11/261; G06F 11/273; G06F 11/3006; G06F 11/3664; G06F 11/3668;
(Continued)

(56) References Cited

U.S. PATENT DOCUMENTS

| 6,446,120 B1 * | 9/2002 | Dantressangle | ........ H04L 43/50 714/E11.193 |
| 9,069,898 B2 | 6/2015 | Nucci et al. | |

(Continued)

FOREIGN PATENT DOCUMENTS

WO WO-2005071560 A1 * 8/2005 ........... A44B 15/005

OTHER PUBLICATIONS

SmartBear Software Tames Undocumented REST APIs by Tracy Wemett published by Business Wire Apr. 9, 2014, retrieved by ProQuest Dialog https://dialog.proquest.com/professional/cv_2188612/docview/1513761290/17DC28DE55E713B0573/2?accountid=131444 (Year: 2014).*

(Continued)

*Primary Examiner* — Joseph O Schell

(57) ABSTRACT

A technique includes accessing, by at least one hardware processor, a recorded request and a recorded response associated with an integration test involving a first computer system and a second computer system. The recorded request was previously issued by the first computer system to the second computer system to cause the second computer system to provide the recorded response. The technique includes, in a virtualized integration test involving the second computer system and initiated using the recorded request, comparing, by the hardware processor(s), the recorded response to a request produced by the second computer system in the virtualized integration test. The technique includes identifying, by the hardware processor(s), an action taken by the second computer system as being likely to be associated with a regression based on the comparison.

20 Claims, 6 Drawing Sheets

(51) Int. Cl.
  *G06F 9/54* (2006.01)
  *G06F 11/273* (2006.01)
  *G06F 11/30* (2006.01)
  *H04W 24/08* (2009.01)
  *G06F 11/34* (2006.01)

(52) U.S. Cl.
  CPC ...... *G06F 11/3006* (2013.01); *G06F 11/3423* (2013.01); *G06F 11/3604* (2013.01); *H04W 24/08* (2013.01)

(58) Field of Classification Search
  CPC .... G06F 11/3684; G06F 11/3688; G06F 9/54; G06F 11/3604; G06F 11/3608
  See application file for complete search history.

(56) References Cited

U.S. PATENT DOCUMENTS

| | | | |
|---|---|---|---|
| 9,146,837 B2 | 9/2015 | Jamison | |
| 10,089,219 B1* | 10/2018 | Bates | G06F 11/3688 |
| 2011/0264961 A1* | 10/2011 | Hong | H04L 43/50 714/38.1 |
| 2015/0212931 A1* | 7/2015 | Hong | H04L 43/50 714/38.1 |
| 2016/0301732 A1* | 10/2016 | Moretto | H04L 43/50 |
| 2016/0342453 A1* | 11/2016 | Khan | G06F 11/0793 |
| 2017/0300402 A1* | 10/2017 | Hoffner | G06F 11/3612 |
| 2017/0353375 A1* | 12/2017 | Paropkari | H04L 43/50 |
| 2018/0210814 A1* | 7/2018 | Mevorach | G06F 11/3612 |
| 2018/0365140 A1* | 12/2018 | Bates | G06F 9/451 |
| 2019/0114182 A1* | 4/2019 | Chalakudi | H04L 63/0435 |
| 2019/0156199 A1* | 5/2019 | Reeve | G06K 9/6219 |
| 2020/0019494 A1* | 1/2020 | Kwon | G06F 11/3608 |
| 2020/0133744 A1* | 4/2020 | MacLeod | G06K 9/6885 |
| 2020/0233787 A1* | 7/2020 | Battaglia | H04L 63/1433 |

OTHER PUBLICATIONS

Heck, Joseph; GitHub; "Proposal Integration Testing"; Revised Feb. 23, 2016; https://github.com/RackHD/RackHD/wiki/proposal-integration-testing; downloaded Aug. 29, 2018; 3 pp.

IBM; "Rational Test Workbench, API testing, functional UI testing, performance testing and service virtualization"; https://www.ibm.com/in-en/marketplace/rational-test-workbench; downloaded Aug. 29, 2018; 4 pp.

India Patent Application No. IN 00450 MUM 2013; Applicant—Tata Consultancy Services Ltd; Inventor: Kumar et al.; Feb. 15, 2013; 77 pp.

Infostretch; "Service Virtualization Services"; www.infostretch.com/service-virtualization/; 2018; 5 pp.

testing experts.com; "The Crucial Role of Service Virtualization for Continuous Delivery"; www.testingexperts.com/blog/The-Crucial-Role-of-Service-Virtualization-for-Continuous-Delivery; Posted May 31, 2017; 11 pp.

Tricentis; "Service Virtualization"; www.tricentis.com/orchestrated-service-virtualization/ 2018; 4 pp.

* cited by examiner

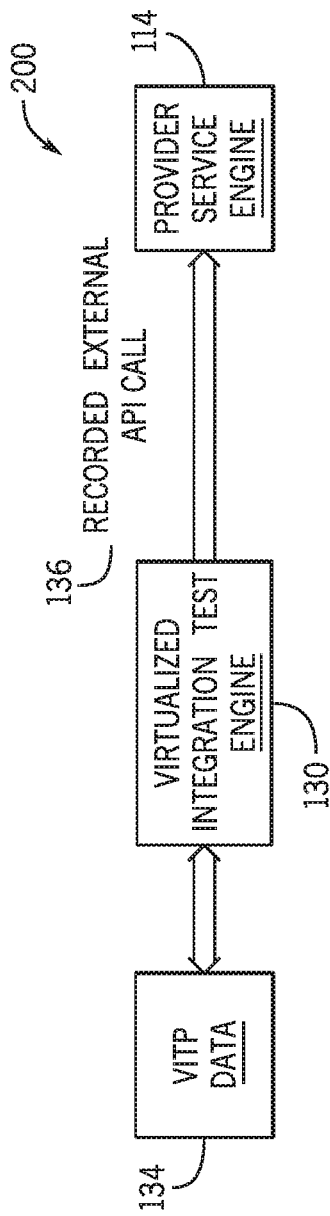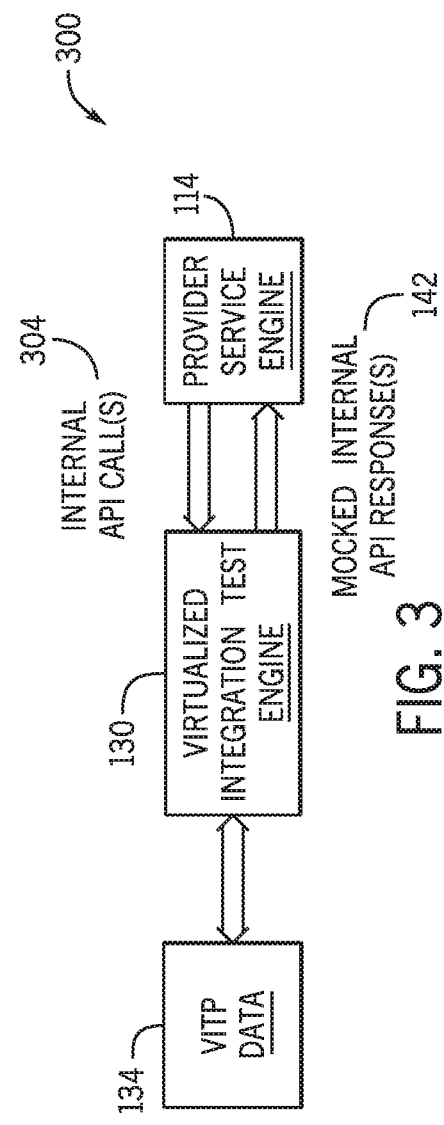

REGRESSION TESTING OF COMPUTER SYSTEMS USING RECORDED PRIOR COMPUTER SYSTEM COMMUNICATIONS

BACKGROUND

An integration test may be used to test the interaction of computer systems. For example, a provider computer system (e.g., a publicly available computer system that is accessible over the internet) may provide a service that may be consumed by client consumer systems. During the various stages of development of the provider computer system, it may be beneficial to test the provider computer system in an integration test environment with consumer computer systems for purposes of evaluating the provider computer system for regressions (e.g., software defects or "bugs," errors, interoperability issues, and so forth). Due to the relative costs involved with setting up an integration test environment, such integration tests may be postponed until the later stages of development of a computer system.

BRIEF DESCRIPTION OF THE DRAWINGS

FIG. 2 is an illustration of the initiation of a virtualized integration test by a virtualized test integration engine according to an example implementation.

FIG. 3 is an illustration of mocked application programming interface (API) responses being provided by the virtualized test integration engine as part of the virtualized integration test according to an example implementation.

DETAILED DESCRIPTION

Figure 1:
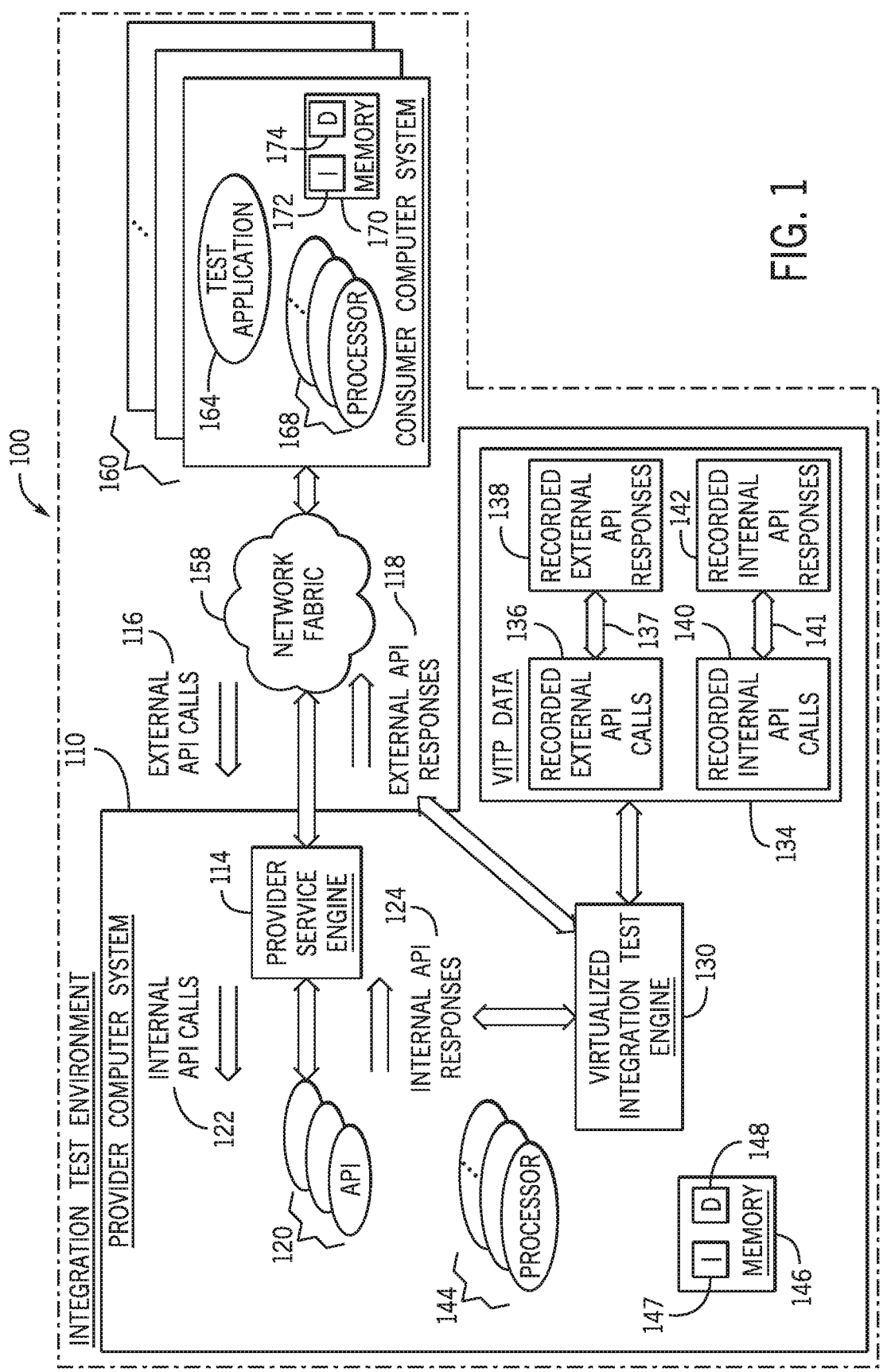
FIG. 1 is an example implementation of an integration test environment illustrating the acquisition of virtualized integration test package data by a virtualized test integration engine for later virtualized integration testing of a computer system according to an example implementation.

During the latter part of the development of a computer system it may be relatively expensive to address regressions. As such, the savings in postponing an integration test may be more than offset by the additional costs involved in addressing regressions that are discovered near the end of the computer system's development. In accordance with example implementations that are disclosed herein, a computer system may be tested in a virtualized integration test using calls and responses, which were recorded in a previously set up integration test environment with the computer system. This allows the computer system to be integration tested in a cost-effective manner during various stages of the computer system's development (i.e., the computer system may be integration tested at different stages of development using virtual integration test environments instead of real, or actual, integration test environments).

More specifically, in accordance with example implementations, an actual (or "non-virtualized") integration test environment may be initially set up, which includes a computer system under test, as well as one or multiple other exemplary computer system systems that are expected to eventually interact with the computer system under test when the computer system under test is placed in production. This actual integration test may be used to test the computer system to identify various issues relating to the integration of the computer system with other computer systems. These issues may relate to regressions, or problems, with the computer system, such as software bugs and errors in the computer system, as well as problems relating to the interoperation of the computer system with other computer systems.

In accordance with example implementations that are described herein, a virtualized test integration engine of the computer system under test records data (also called "virtualized integration test package data" herein) during the actual integration test for later use in a virtualized integration test of the computer system. The virtualized integration test package data, in accordance with example implementations, represents both internal and external communications (e.g., internal and external application programming interface (API) calls and API responses) that occur during the actual integration test; and as further described herein, the virtualized test integration engine uses the recorded communications in a virtualized integration test of the computer system for such purposes as initiating the virtualized integration test, mocking responses of the computer system and identifying regressions.

In this context, a "computer system" may be a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

As used herein, "mocking" a response of a computer system refers to simulating a response in a controlled way. In accordance with example implementations, mocking a response to a computer system refers to simulating a response by the computer system based on prior, observed behavior of the computer system. Moreover, in accordance with example implementations, mocking a response of the computer system includes replaying a previously observed response of the computer system to a similar set of observed input to the computer system. For example, as further described herein, in accordance with example implementations, mocking a response of the computer system includes mocking an API response to an API call by replaying a previously observed (and recorded) API response of the computer system to the API call.

As a more specific example, the computer system under test may be a provider computer system, which provides a particular service to one or multiple consumer computer systems; and the actual and virtualized integration tests are used to identify regressions (e.g., software bugs, errors, interoperability problems, and so forth) related to the interaction of the provider computer system with consumer computer systems. The "service" that is provided by the provider computer system may be any of a number of different services. As an example, the service that is provided by the service computer system may be a real-time application monitoring service, which may, for example, monitor the performance of an application (e.g., a publicly available internet-accessible application) that is executing on a consumer computer system for such purposes as identifying performance bottlenecks of the application, identifying slow response times, performing diagnostics on the application, and so forth. However, in accordance with further example implementations, the service may be services other than application monitoring services, such as storage services, database services, security threat monitoring services, and so forth.

To use the service that is provided by the provider computer system, a given consumer computer system may, in accordance with example implementations, provide, or communicate, calls to APIs (called "API calls" or "external API calls" herein), and the provider computer system responds to the API calls with corresponding communications in the form of API responses (called "external API responses" herein). In this context, an "API" refers to a function, service and/or data structure that may be accessed through a corresponding API request, or call; and the corresponding API response provides the communication protocol, function service and/or data structure. The external API calls and external API responses may, in accordance with example implementations, be network APIs calls and responses, respectively, which access network programming functions for purposes of allowing the consumer computer system to invoke services of the provider computer system. As examples, a network API may be a Simple Object Access Protocol (SOAP), Representational State Transfer (REST) or Remote Procedure Call (RFC) API.

To provide a requested service to a consumer computer system, the provider computer system may generate internal API calls to APIs that are accessible inside the provider computer system (i.e., do not involve external API calls, such as network API calls). As an example, the provider computer system may execute an internal API call to an API that is part of a library, such as a dynamic link library (DLL), for purposes of performing a particular subroutine or set of subroutines.

In accordance with example implementations that are described herein, the virtualized test integration engine of the provider computer system packages data (i.e., stores the data as a unit, such as a file) during an actual integration test to form a virtualized integration test package, which represents internal and external communications that occurred during the integration test. As an example, in accordance with some implementations, the virtualized test integration engine may record the following in connection with the integration test: external API calls, external API responses, external API calls and internal API responses. Moreover, in accordance with example implementations, the virtualized integration test package may be stored in a format that indexes, or maps, the external API calls to the corresponding external API responses and indexes, or maps, the internal API calls to the corresponding internal API responses.

Using the virtualized integration test package, the virtualization test integration engine may, as described herein, conduct virtual integration tests of the provider computer system to test the integration of the provider computer system at different stages in its development cycle, without requiring the construction of an actual integration test environment with consumer computer systems. For a given virtualized integration test, the virtualization integration engine may mock internal API responses to corresponding internal API requests by replaying the recorded API responses (from the virtualized integration test package) that corresponds to the internal API requests. Moreover, as described herein, the virtualized integration test engine may use the external API responses (as recorded in the virtualized test package) as benchmarks for comparison against external API responses that are generated in the virtualized integration test for purposes of identifying regressions.

Referring to FIG. 1, as a more specific example, a provider computer system 110 may be placed in an integration test environment 100 with one or multiple consumer computer systems 160 for purposes of conducting an actual integration test of the provider computer system 110. The actual integration test allows a virtualized test integration engine 130 of the provider of the computer system 110 to record data (called "virtualized integration test package data 134" herein), which is used to conduct future virtualized integration tests of the provider computer system 110. As an example, the virtualized integration test package data 134 may be stored as a file in a particular file format (a text file, an eXtended Markup Language (XML) file and so forth). In accordance with example implementations, the virtualized integration test package data 134 allows the virtualized test integration engine 130 of the provider computer system 110 to conduct future virtual integration tests using recorded API calls and responses for purposes of evaluating the provider computer system 110 in future development cycles without setting up an actual integration test environment, such as exemplary integration test environment 100.

More specifically, to set the stage for the virtualized integration tests, an actual integration test environment, such the integration test environment 100 that is depicted in FIG. 1, may be used. Using the integration test environment 100, the provider computer system 110 may communicate with one or multiple consumer computer systems 160 for purposes of running, or executing, integration tests with these consumer computer systems 160. In this manner, a given consumer computer system 160 may execute a test application 164 as part of an integration test in which the given consumer computer system 160 requests one or multiple services from the provider computer system 110. In this manner, in accordance with example implementations, each consumer computer system 160 may perform one or multiple integration tests with the provider computer system 110 in the integration test environment 110. For a given integration test, a virtualized test integration engine 130 of the provider computer system 110 may record virtualized integration test package data 134 for purposes of allowing future, virtualized integration tests to be performed on the provider computer system 110, all without the provider computer system 110 being connected to any of the consumer computer systems 160.

In a given integration test, a consumer computer system 160 may execute the test application 164, which causes the consumer computer system 160 to provide one or multiple external API calls 116 to the provider computer system 110. For example, the test application 164 may, during its execution, generate external API calls 116 (e.g., network API calls) to access various services or functions that are provided by a provider service engine 114 of the provider computer system 110. The provider service engine 114 may, as an example, provide real time application monitoring, such as monitoring the test application 164. Moreover, for this monitoring, in accordance with example implementations, the provider service engine 114 may access one or multiple other computer systems (a computer system providing a machine learning service to detect issues with the test application 164 based on the monitored performance data, for example).

In response to the external API calls 116, the provider service engine 114 provides external API responses 118, such as external network API calls, back to the consumer computer system 160. For example, the external API responses 118 may be API calls that report metrics, statistics, detected issues, and so forth, with the real time data that is monitored by the provider service engine 114.

In providing the requested services and/or functions, the provider service engine 114 may access various APIs 120 of the provider computer system 110. For example, the APIs 120 may be stored in a database, in a library (e.g. a dynamic linked library (DLL)), and so forth, on the provider computer system 110. To access a particular internal API 120, the provider service engine 114 may generate an internal API call 122, and the corresponding internal API 120 may generate a corresponding internal API response 124.

The virtualized test integration engine 130 monitors and records the external API calls 116, the external API responses 118, the internal API calls 122 and the internal API response 124 for purposes of acquiring the virtualized integration test package data 134 for future virtualized integration testing of the provider computer system 110. More specifically, in accordance with example implementations, the virtualized integration test package data 134 includes data representing recorded external API calls 136, and recorded external API responses 138. Moreover, the virtualized integration test package data 134 may represent a mapping 137 between the recorded external API calls 136 and the recorded external API responses 138; and the virtualized integration test package data 134 may include data representing the recorded internal API calls 140 and recorded internal API responses 142, as well as a mapping 141 between the calls 140 and responses 142.

In accordance with some implementations, the mappings 137 and 141 may be represented by the format or structure of a file that contains the virtualized integration test package data 134. For example, such a file may contain a section with rows of recorded internal API calls and corresponding responses, with each row containing, for example, a recorded internal API call and the corresponding recorded internal API response. Recorded external API calls and responses may be arranged similarly in another section of the file, for example. Other arrangements may be used to represent the mappings 137 and 141, in accordance with further implementations.

As depicted in FIG. 1, in accordance with example implementations, the provider 110 and consumer 160 computer systems may each include one or multiple actual physical machines. In this context, an actual physical machine includes actual hardware and machine executable instructions (or "software"). It is noted that although this a reference to actual physical machines, any of these actual physical machines may establish one or multiple virtual machines or abstractions of hardware.

As an example, the provider computer system 110, as well as each of the consumer computer systems 160, may include one or multiple computer components, such as servers, clients, desktop computers, tablet computers, web servers, wearable computers, portable computers, smartphones, thin clients, rack-mounted computers, blade-based computers, clusters of computers, network switches, network routers, gateways, and so forth. Moreover, the provider 110 and consumer 160 computer systems may be part of a public cloud, a private cloud, a private system, a hybrid cloud (a mixture of public and private clouds) and so forth. In accordance with some implementations, the provider computer system 110 may be a web server that is publicly accessible over the internet, and the consumer systems may be private clients.

In accordance with example implementations, the consumer computer systems 160 may communicate with the provider computer system 110 over network fabric 158. In general, the network fabric 158 may include components and use protocols that are associated with one or multiple types of communication networks, such as (as examples) Fibre Channel networks, iSCSI networks, ATA over Ethernet (AoE) networks, HyperSCSI networks, local area networks (LANs), wide area networks (WANs), global networks (e.g., the Internet), wireless networks, or any combination thereof.

The provider computer system 110 may include such hardware as one or multiple processors 144, a memory 146, mass storage devices (e.g., non-volatile memory devices, hard disk drives, and so forth), network switches, network interface controllers, drive controllers, I/O devices, and so forth. In accordance with example implementations, the processor 144 may include one or multiple central processing units (CPUs), one or multiple CPU processing cores, and so forth. In general, the memory 146 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 146 may store various data 148, such as the virtualized integration test package data 134, parameters used in the acquisition of the virtualized integration test package data 134 by the virtualized test integration engine 130, parameters controlling which API calls and responses are recorded, parameters describing the degree of mismatches indicating regressions, and so forth. Moreover, the memory 146 may, in accordance with example implementations, store machine executable instructions 147 that, when executed by the processor(s) 144, cause the processor(s) 144 to form one or multiple components of the provider computer system 110, such as the provider service engine 114, the virtualized test integration engine 130, the internal APIs 120, and so forth.

In accordance with some implementations, the processor 144 may be a hardware circuit that does not execute machine executable instructions. For example, in accordance with some implementations, the virtualized test integration engine 130 and/or the provider service engine 114, may be formed in whole or in part by an application specific integrated circuit (ASIC), a field programmable gate array (FPGA), and so forth. Thus, many implementations are contemplated, which are within the scope of the appended claims.

In a similar manner, in accordance with example implementations, a given consumer computer system 160 may include one or multiple processors 168 as well as a memory 170 that stores machine executable instructions 172 and data 174. As an example, the instructions 172 may be executed by one or multiple processors 168 for purposes of executing the test application 164 to generate the external API calls 116 and respond to the external API responses 118, and so forth.

Figure 4:
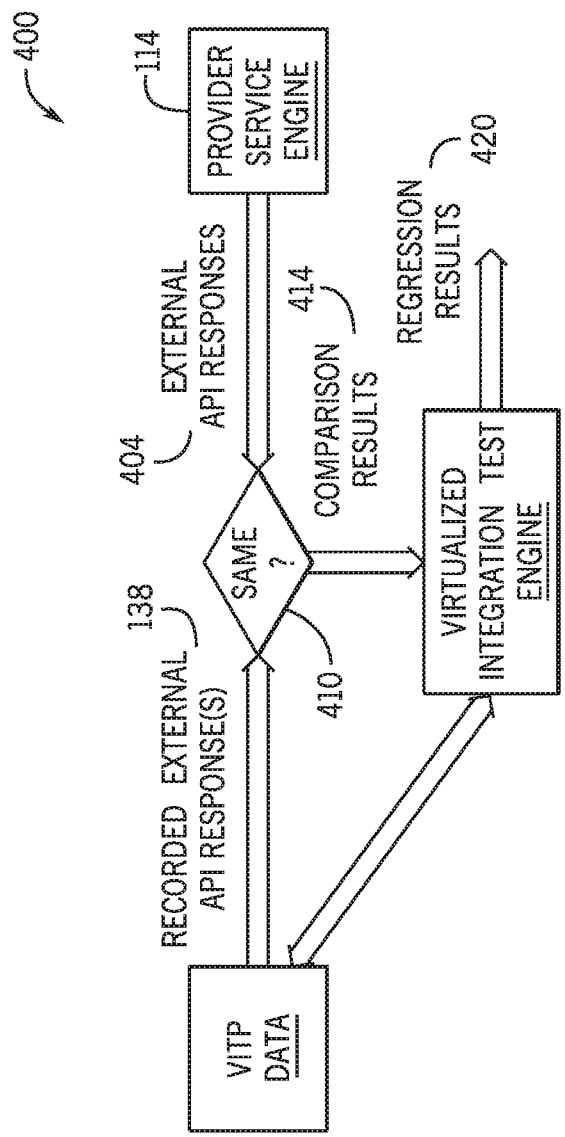
FIG. 4 is an illustration of a comparison made by the virtualized test integration engine in the virtualized integration test to identify regressions according to an example implementation.

In accordance with example implementations, the virtualized test integration engine 130 may conduct a virtualized integration test of the provider computer system 110 using the virtualized integration test package data 134, as illustrated in FIGS. 2, 3 and 4. More specifically, referring to FIG. 2 in conjunction with FIG. 1, the virtualized test integration engine 130 may begin an initial phase 200 of the virtualized integration test by providing a recorded external API call 136 to the provider service engine 114. In this manner, in accordance with some implementations, the virtualized test integration engine 130 may conduct several tests of the provider service engine 114, with each of these tests being initiated by the virtualized test integration engine 130 providing the provider service engine 114 with one of the recorded external API calls 136 from the virtualized integration test package data 134.

Referring to FIG. 3 in conjunction with FIG. 1, in response to the recorded external API call 136 (FIG. 2), the provider service engine 114 may generate one or multiple internal API calls 304 to the internal APIs 120 (FIG. 1) for purposes of processing the external API call 136. As illustrated in the phase 300, the virtualized test integration engine 130 provides one or multiple mocked API responses 142 to the internal API call(s) 304. In this manner, in accordance with some implementations, the virtualized test integration engine 130 uses the indexing, or mapping 141, which is recorded in the virtualized integration test package data 134 to match the internal API call(s) 304 to corresponding recorded internal API responses 142, which the virtualized test integration engine 130 provides as the mocked API response(s) 142.

FIG. 4 illustrates the final phase 400 of the virtualized integration test. Referring to FIG. 4 in conjunction with FIG. 1, in the final phase 400, the provider service engine 114 provides the response to the initial recorded external API call 136 (FIG. 2) in the form of an external API response 404. The virtualized test integration engine 130 compares the external API response 404 to a corresponding recorded external API response 138 provided by the virtualized integration test package data 134. In this manner, the virtualized integration test package data 134 contains the indexing, or mapping 137, between the recorded external API calls 136 and the recorded external API responses 138, and from this mapping 137, the virtualized test integration engine 130 may determine the recorded external API response that corresponds to the external API response 404 that is provided by the provider service engine 114. As such, the virtualized test integration engine 130, in accordance with example implementations, produces comparison results 414 (e.g., results 414 representing whether the external API responses 138 and 404 match).

Determining whether a pair of external API responses 138 and 404 match may involve applying any of a number of matching criteria, depending on the particular implementation. For example, in accordance with some implementations the virtualized test integration engine 130 may deem a pair of external API responses 138 and 404 to match in response to an exact match occurring (e.g., the API response name and all of the API parameters being identical). In accordance with further example implementations, the virtualized test integration engine 130 may deem a pair of external API responses 138 and 404 to match in response to selected parameters of the external API responses 138 and 404 matching. The matching criteria may be user-specified by configuration data in accordance with some implementations.

Based on the comparison results 414, the virtualized test integration engine 130 may then provide regression results 420. In this manner, in accordance with some implementations, in response to the comparison analysis, the virtualized test integration engine 130 may produce a report that identifies API responses 404 that were determined not to match with the recorded API responses 138 and thus, this report may be used for further potential regression analysis.

Figure 5:
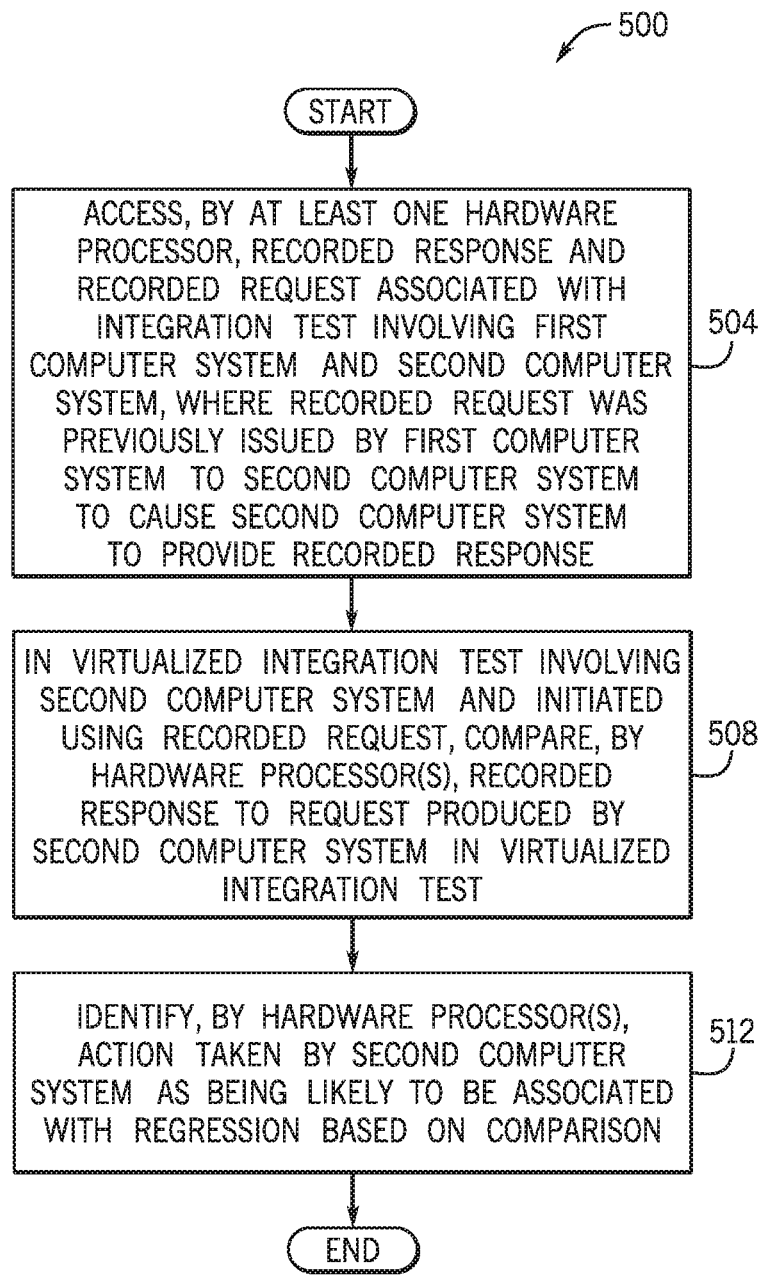
FIG. 5 is a flow diagram depicting a technique to identify an action taken by a computer system likely to be associated with a regression according to an example implementation.

Referring to FIG. 5, in accordance with example implementations, a technique 500 includes accessing (block 504), by at least one hardware processor, a recorded request and a recorded response associated with an integration test involving a first computer system and a second computer system. The recorded request was previously issued by the first computer system to the second computer system to cause the second computer system to provide the recorded response. The technique 500 includes, in a virtualized integration test involving the second computer system and initiated using the recorded request, comparing (block 508), by the hardware processor(s), the recorded response to a request produced by the second computer system in the virtualized integration test. The technique 500 includes identifying (block 512), by the hardware processor(s), an action taken by the second computer system as being likely to be associated with a regression based on the comparison.

Figure 6:
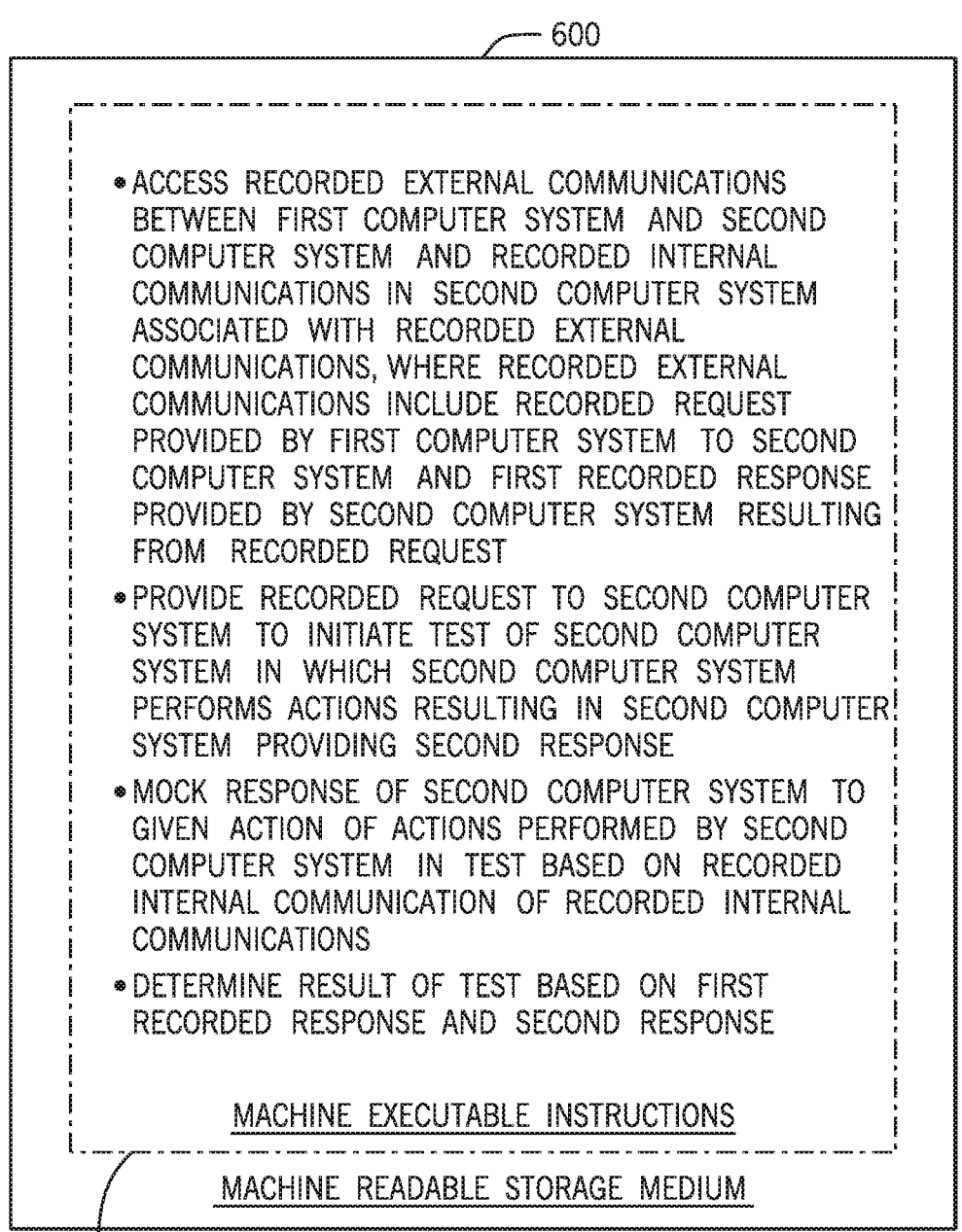
FIG. 6 is an illustration of machine executable instructions stored on a machine-readable storage medium to cause the machine to use mocked and recorded communications to test a computer system according to an example implementation.

Referring to FIG. 6, in accordance with example implementations, a non-transitory machine readable storage medium 600 stores instructions 610 that, when executed by a machine, cause the machine to access recorded external communications between a first computer system and a second computer system and recorded internal communications in the second computer system associated with the recorded external communications. The recorded external communications include a recorded request provided by the first computer system to the second computer system and a first recorded response provided by the second computer system resulting from the recorded request. The instructions 610, when executed by the machine, further cause the machine to provide the recorded request to the second computer system to initiate a test of the second computer system in which the second computer system performs actions resulting in the second computer system providing a second response; mock a response of the second computer system to a given action of the actions performed by the second computer system in the test based on a recorded internal communication of the recorded internal communications; and determine a result of the test based on the first recorded response and the second response.

Figure 7:
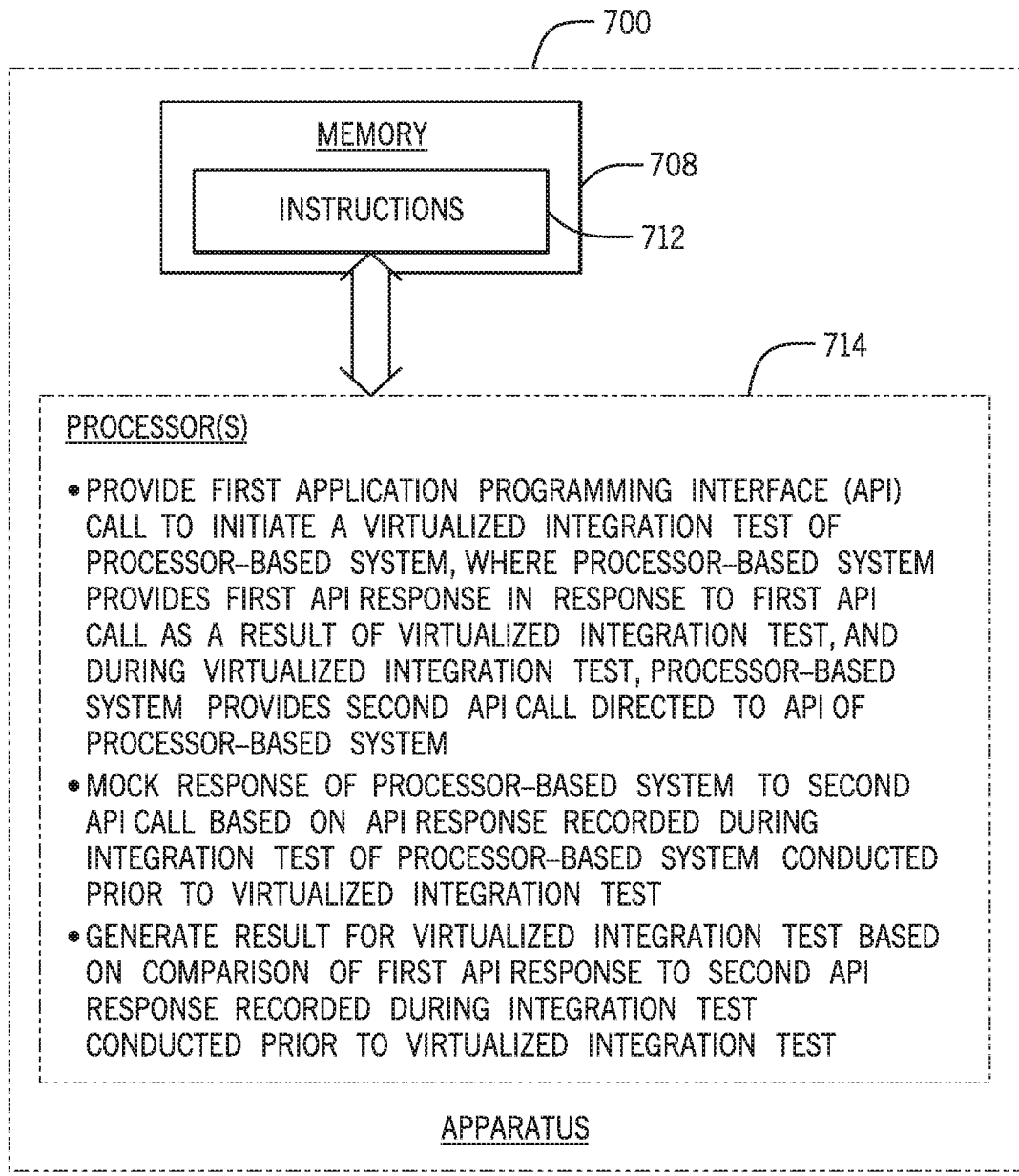
FIG. 7 is a schematic diagram of a system to used mocked and recorded communications to test a computer system according to an example implementation.

Referring to FIG. 7, in accordance with example implementations, an apparatus 700 includes at least one processor 714 and a memory 708 to store instructions 712 that, when executed by the processor(s) 714, cause the processor(s) 714 to provide a first application programming interface (API) call to initiate a virtualized integration test of a processor-based system. The processor-based system provides a first API response in response to the first API call as a result of the virtualized integration test; and during the virtualized integration test, the processor-based system provides a second API call directed to an API of the processor-based system. The instructions 712, when executed by the processor(s) 714, further cause the processor(s) 714 to mock a response of the processor-based system to the second API call based on an API response recorded during an integration test of the processor-based system conducted prior to the virtualized integration test; and generate a result for the virtualized integration test based on a comparison of the first API response to a second API response recorded during the integration test conducted prior to the virtualized integration test.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
causing a test application to be executed for an actual integration test involving a server computer system and a client computer system, wherein the execution of the test application generates an external application programming interface (API) call from the client computer system and an external API response from the server computer system;
recording, by a processor of the server computer system, integration test data of the actual integration test, including recording the external API call and the external API response;
executing, by the processor, a virtualized integration test of the server computer system without involving any client computer system, including: executing the recorded external API call associated with the actual integration test on the test application, and generating a mocked external API response in response to the execution of the recorded external API call;
determining, by the processor, whether the recorded external API response associated with the actual integration test matches the mocked external API response associated with the virtualized integration test; and
in response to a determination that the recorded external API response does not match the mocked external API response, identifying, by the processor, an action to be taken by the server computer system as being likely to be associated with a regression.

2. The method of claim 1, wherein:
the server computer system provides a service consumed by the client computer system; and
identifying the action comprises generating a notification that identifies a response provided by the service as likely to be associated with the regression.

3. The method of claim 1, the method further comprising:
in response to the external API call from the client computer system, generating an internal API call for accessing data of the server computer system and an internal API response containing the data of the server computer system.

4. The method of claim 3, further comprising:
creating a mapping from the internal API call to the internal API response.

5. The method of claim 1, further comprising:
creating a mapping from the recorded external API call to the recorded external API response.

6. The method of claim 1, further comprising:
generating a comparison result representing whether the recorded external API response matches the mocked external API response.

7. The method of claim 1, wherein identifying the action as likely being associated with the regression comprises generating a notification of the action likely being associated with the regression.

8. The method of claim 1, further comprising:
in response to the external API call from the cheat computer system, generating an internal request for internal data in the server computer system and an internal response with the internal data.

9. The method of claim 8, wherein recording the integration test data of the actual integration test further includes:
recording the internal request and the internal response.

10. The method of claim 1, further comprising:
generating a report that identifies the mocked external API response that does not match the recorded external API response.

11. A non-transitory machine readable storage medium storing instructions that, when executed by a machine, cause the machine to:
cause a test application to be executed for an actual integration test involving a server computer system and a client computer system, Wherein the execution of the test application generates an external application programming interface (API) call from the client computer system and an external API response from the server computer system;
record integration test data of the actual integration test, including the external API call and the external API response;
execute a virtualized integration test of the server computer system without involving any client computer system, including: executing the recorded external API call associated with the actual integration test, and generating a mocked external API response in response to the execution of the recorded external API call;
determine whether the recorded external API response associated with the actual integration test matches the mocked external API response associated with the virtualized integration test; and
in response to a determination that the recorded external API response does not match the mocked external API response, identify an action to be taken by the server computer system as being likely to be associated with a regression.

12. The non-transitory machine readable storage medium of claim 11, wherein the instructions, when executed, cause the machine to:
in response to the external API call from the client computer system, generate an internal request for internal data within the server computer system and an internal response with the internal data; and
record the internal request and the internal response as part of the integration test data of the actual integration test.

13. The non-transitory machine readable storage medium of claim 11, wherein the instructions, when executed by the machine, further cause the machine to:
create a mapping from the recorded external API call to the recorded external API response.

14. The non-transitory machine readable storage medium of claim 11, wherein the instructions, when executed by the machine, further cause the machine to:
use a given action performed by the client computer system as an index to a recorded internal communication, wherein the mocked external API response comprises an API call of the recorded internal communication.

15. An apparatus comprising:
at least one processor; and
a memory storing instructions that, when executed by the at least one processor, cause the at least one processor to:
cause a test application to be executed for an actual integration test involving a server computer system and a client computer system, wherein the execution of the test application generates an external application programming interface (API) call from the client computer system and an external API response from the server computer system;
record integration test data of the actual integration test, including the external API call and the external API response;

execute a virtualized integration test of the server computer system without involving any client computer system, including: executing the recorded external API call associated with the actual integration test, and generating a mocked external API response in response to the execution of the recorded external API call;

determine whether the recorded external API response associated with the actual integration test matches the mocked external API response associated with the virtualized integration test; and in response to a determination that the recorded external API response does not match the mocked external API response, identify an action taken by the server computer system as being likely to be associated with a regression.

16. The apparatus of claim 15, wherein the instructions, when executed, further cause the at least one processor to:
create a mapping from the recorded external API call to the recorded external API response.

17. The apparatus of claim 15, wherein the instructions, when executed by the at least one processor, cause the at least one processor to:
provide another API call to initiate another virtualized integration test of the server computer system; and
mock a response of the server computer system to said another API call based on an API response recorded during said another virtualized integration test of the server computer system.

18. The apparatus of claim 15, wherein:
the server computer system provides a service to the client computer system;
the virtualized integration test comprises a test conducted without the server computer system being connected to the client computer system; and
the actual integration test of the server computer system conducted prior to the virtualized integration test was performed with the client computer system being connected to the server computer system.

19. The apparatus of claim 15, wherein, to determine whether the recorded external API response matches the mocked external API response, the instructions, when executed by the at least one processor, cause the at least one processor to compare the mocked external API response to the recorded external API response to determine whether the mocked external API response is an exact match to the recorded external API response.

20. The apparatus of claim 15, wherein the instructions, when executed by the at least one processor, cause the at least one processor to:
in response to the external API call from the client computer system, generate an internal request for internal data in the server computer system and an internal response with the internal data; and
record the internal request and the internal response as part of the integration test data of the actual integration test.

\* \* \* \* \*